(12) United States Patent
Kozlowski

(10) Patent No.: US 8,978,052 B1
(45) Date of Patent: Mar. 10, 2015

(54) SYSTEM AND METHODS FOR INTER-DRIVER COMMUNICATION

(75) Inventor: Michael Kozlowski, Granite Bay, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1185 days.

(21) Appl. No.: 12/551,302

(22) Filed: Aug. 31, 2009

Related U.S. Application Data

(60) Provisional application No. 61/173,875, filed on Apr. 29, 2009.

(51) Int. Cl.
*G06F 9/44* (2006.01)
*H04L 29/06* (2006.01)

(52) U.S. Cl.
USPC .......................................... 719/327; 709/250

(58) Field of Classification Search
None
See application file for complete search history.

(56) References Cited

U.S. PATENT DOCUMENTS

| | | | |
|---|---|---|---|
| 5,309,563 A * | 5/1994 | Farrand et al. ................ | 709/216 |
| 6,233,624 B1 | 5/2001 | Hyder et al. | |
| 6,470,397 B1 | 10/2002 | Shah et al. | |
| 6,952,830 B2 | 10/2005 | Madineni et al. | |
| 7,043,565 B1 | 5/2006 | Madden et al. | |
| 7,107,044 B1 * | 9/2006 | Zaidi et al. ................. | 455/412.1 |
| 7,307,948 B2 | 12/2007 | Infante et al. | |
| 2006/0253859 A1* | 11/2006 | Dai et al. ...................... | 719/321 |
| 2007/0006236 A1* | 1/2007 | Durham et al. ............... | 719/318 |
| 2007/0268820 A1* | 11/2007 | McGee et al. ................ | 370/217 |
| 2009/0007152 A1 | 1/2009 | Cahill et al. | |
| 2009/0113458 A1* | 4/2009 | Finger et al. .................. | 719/327 |

FOREIGN PATENT DOCUMENTS

WO  WO-2008/077628  7/2008

\* cited by examiner

*Primary Examiner* — Andy Ho
*Assistant Examiner* — Abdou Seye
(74) *Attorney, Agent, or Firm* — Klein, O'Neill & Singh, LLP

(57) ABSTRACT

In certain embodiments host system drivers communicate with one another via messages posted to mailbox registers in a network adapter. Executable code within the network adapter's memory notifies host system drivers of posted messages, waits for acknowledgments from the drivers and sends a completion notification to the host system drivers.

15 Claims, 3 Drawing Sheets

US 8,978,052 B1

SYSTEM AND METHODS FOR INTER-DRIVER COMMUNICATION

CROSS-REFERENCE TO RELATED APPLICATION

This application claims priority to provisional application Ser. No. 61/173,875, filed on Apr. 29, 2009, the entire contents of which are hereby incorporated by reference.

BACKGROUND

The present invention relates to communication between drivers in a network device.

DESCRIPTION OF RELATED ART

It is believed that in the current state of the art there is no available mechanism for drivers in a host system to communicate with one another. In fact, there may be no reason for host system drivers to communicate with one another, because they do not share hardware resources.

SUMMARY

The various embodiments of the present system and methods for inter-driver communication have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which include reducing the likelihood of conflicts between two drivers sharing a particular hardware resource.

One aspect of the present system and methods includes the realization that there is a recent move toward enabling host system drivers to share hardware resources. If host system drivers are to share hardware resources, it would be advantageous for the drivers to communicate with one another in order to reduce the likelihood of conflicts between two drivers sharing a particular hardware resource.

One of the present embodiments comprises a machine-implemented method for enabling drivers in a host system to communicate with each other. The host system executes a first driver associated with a first function in a network adapter and other drivers associated with other functions in the network adapter. The method comprises the first host system driver posting a message in the network adapter. The message indicates that the first host system driver is about to perform an action. The method further comprises executable code stored in memory of the network adapter notifying the other host system drivers of contents of the posted message. The method further comprises the other host system drivers acknowledging receipt of the notification. The method further comprises the executable code waiting for all of the other host system drivers to either acknowledge receipt of the notification or timeout after a specified amount of time. The method further comprises the executable code sending a completion notification to all of the host system drivers.

Another of the present embodiments comprises a machine readable storage medium storing executable instructions, which when executed by a machine, cause the machine to perform a process for enabling drivers in a host system to communicate with each other. The host system executes a first driver associated with a first function in a network adapter and other drivers associated with other functions in the network adapter. The method comprises the first host system driver posting a message in the network adapter. The message indicates that the first host system driver is about to perform an action. The method further comprises executable code stored in memory of the network adapter notifying the other host system drivers of contents of the posted message. The method further comprises the other host system drivers acknowledging receipt of the notification. The method further comprises the executable code waitina for all of the other host system drivers to either acknowledge receipt of the notification or timeout after a specified amount of time. The method further comprises the executable code sending a completion notification to all of the host system drivers.

Another of the present embodiments comprises a computer program product, comprising a computer usable storage medium having computer readable instructions embodied therein for enabling drivers in a host system to communicate with each other. The host system executes a first driver associated with a first function in a network adapter and other drivers associated with other functions in the network adapter. The computer readable instructions comprise the first host system driver posting a message in the network adapter. The message indicates that the first host system driver is about to perform an action. The method further comprises executable code stored in memory of the network adapter notifying the other host system drivers of contents of the posted message. The method further comprises the other host system drivers acknowledging receipt of the notification. The method further comprises the executable code waiting for all of the other host system drivers to either acknowledge receipt of the notification or timeout after a specified amount of time. The method further comprises the executable code sending a completion notification to all of the host system drivers.

BRIEF DESCRIPTION OF THE DRAWINGS

The various embodiments of the present system and methods for inter-driver communication now will be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

Figure 1:
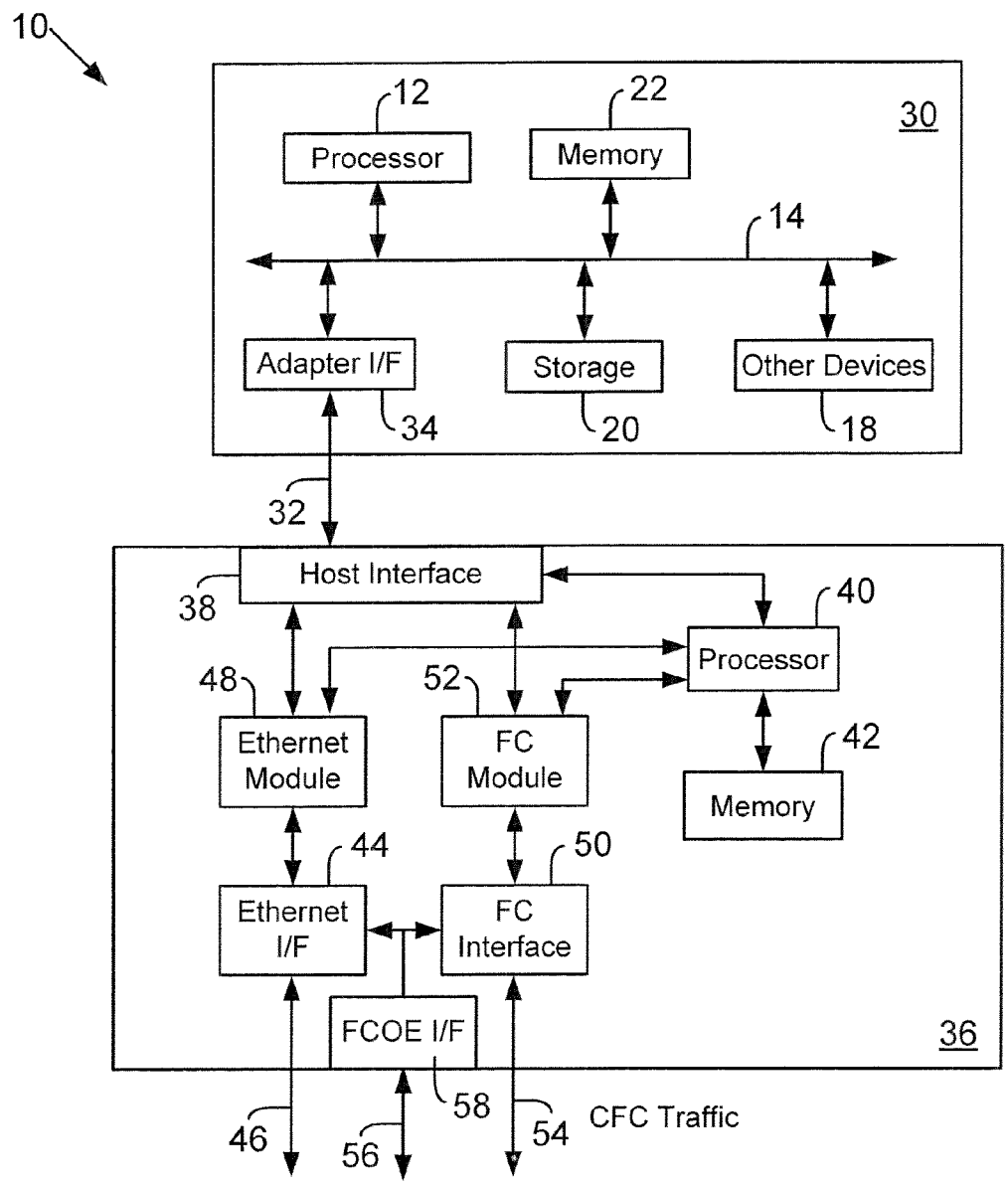
FIG. 1 is a block diagram of a converged network adapter coupled to a host system.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

FIG. 1 is a block diagram of a system 10 including a computing system 30 (may also be referred to as "host system 30") coupled to an adapter 36 interfaces with network and storage devices (not shown). The host system 30 may include a processor 12, also known as a central processing unit (CPU). The processor 12 executes computer-executable process steps and interfaces with a computer bus 14. The computer bus 14 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus. An adapter interface 34 facilitates the ability of the host system 30 to interface with the adapter 36, as described below. The host system 30 also includes other devices and interfaces 18, which may include a display device interface, a keyboard interface, a pointing device interface, etc.

The host system 30 may further include a storage device 20, which may be for example a hard disk, a CD-ROM, a non-volatile memory device (flash or memory stick) or any other device. Storage 20 may store operating system program files, application program files, and other files. Some of these files are stored on storage 20 using an installation program. For example, the processor 12 may execute computer-executable process steps of an installation program so that the processor 12 can properly execute the application program.

Memory 22 also interfaces to the computer bus 14 to provide the processor with access to memory storage. Memory 22 may include random access main memory (RAM), and/or read only memory (ROM). When executing stored computer-executable process steps from storage 20, the processor 12 may store and execute the process steps out of RAM. ROM may store invariant instruction sequences, such as start-up instruction sequences or basic input/output operating system (BIOS) sequences for operation of a keyboard (not shown).

With continued reference to FIG. 1, the adapter 36 is coupled to the host system 30 via link 32 and adapter interface 34. The adapter 36 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a SAN. This functionality would allow Fibre Channel to leverage 10 Gigabit Ethernet networks while preserving the Fibre Channel protocol. The adapter 36 shown in FIG. 1 may be configured to operate as a FCOE adapter and may be referred to as FCOE adapter 36. QLogic Corporation, the assignee of the present application, provides one such adapter. Those of ordinary skill in the art will appreciate, however, that the present embodiments are not limited to any particular protocol. The illustrated FCOE adapter 36 is merely one example of a converged network adapter that may leverage the advantages of the present embodiments.

The FCOE adapter 36 interfaces with the host system 30 via a host interface 38. In one embodiment, the host interface 38 may be a PCI Express interface coupled to the link which may be a PCI Express link. The FCOE adapter 36 may also include a processor 40 that executes firmware instructions out of memory 42 to control overall FCOE adapter 36 operations.

The FCOE adapter 36 includes an Ethernet interface 44 that may transmit and receive network packets via a link 46 to a network (not shown). Ethernet interface 44 may include memory buffers to temporarily store information received from other network devices and transmitted to other network devices. The FCOE adapter 36 also includes an Ethernet Module 48 that interfaces with the Ethernet interface 44 and the host system 30 to process packets in the receive path (coming in from the network) and the transmit path (going out to the network).

The FCOE adapter 36 may also include a Fibre Channel (FC) interface 50 that receives FC traffic from an FC storage area network (SAN) and sends information out to FC storage devices (not shown). FC interface 44 may include memory buffers (not shown) to temporarily store information received from FC storage devices and transmitted by FCOE adapter 36 to FC storage devices. An FC module 52 interfaces with both the FC interface 50 and the host system 30 to send and receive FC frames.

In FIG. 1, although separate links 46, 54 are shown for network and storage related traffic, a single link 56 may be used to route network/storage packets (e.g. FCOE packets). FCOE packets are initially received by an FCOE I/F 58 and then routed to the Ethernet I/F 44 or the FC Interface 50.

The FCOE adapter 36 may include a plurality of ports (not shown). The host system 30 communicates with the network through the ports. To connect with one of the ports, the host computing system 30 typically communicates through a function. A function is a logical device residing at the FCOE adapter 36. A function consists of a set of standardized control/status registers, which a software driver in the host system uses to communicate with the FCOE adapter 36, and user-defined logic (control path, data path, RISC processors, Ethernet and/or FC link interface, etc.) that is associated with those registers. The FCOE adapter 36 resources are carved up into multiple sub-devices, also known as functions.

Figure 2:
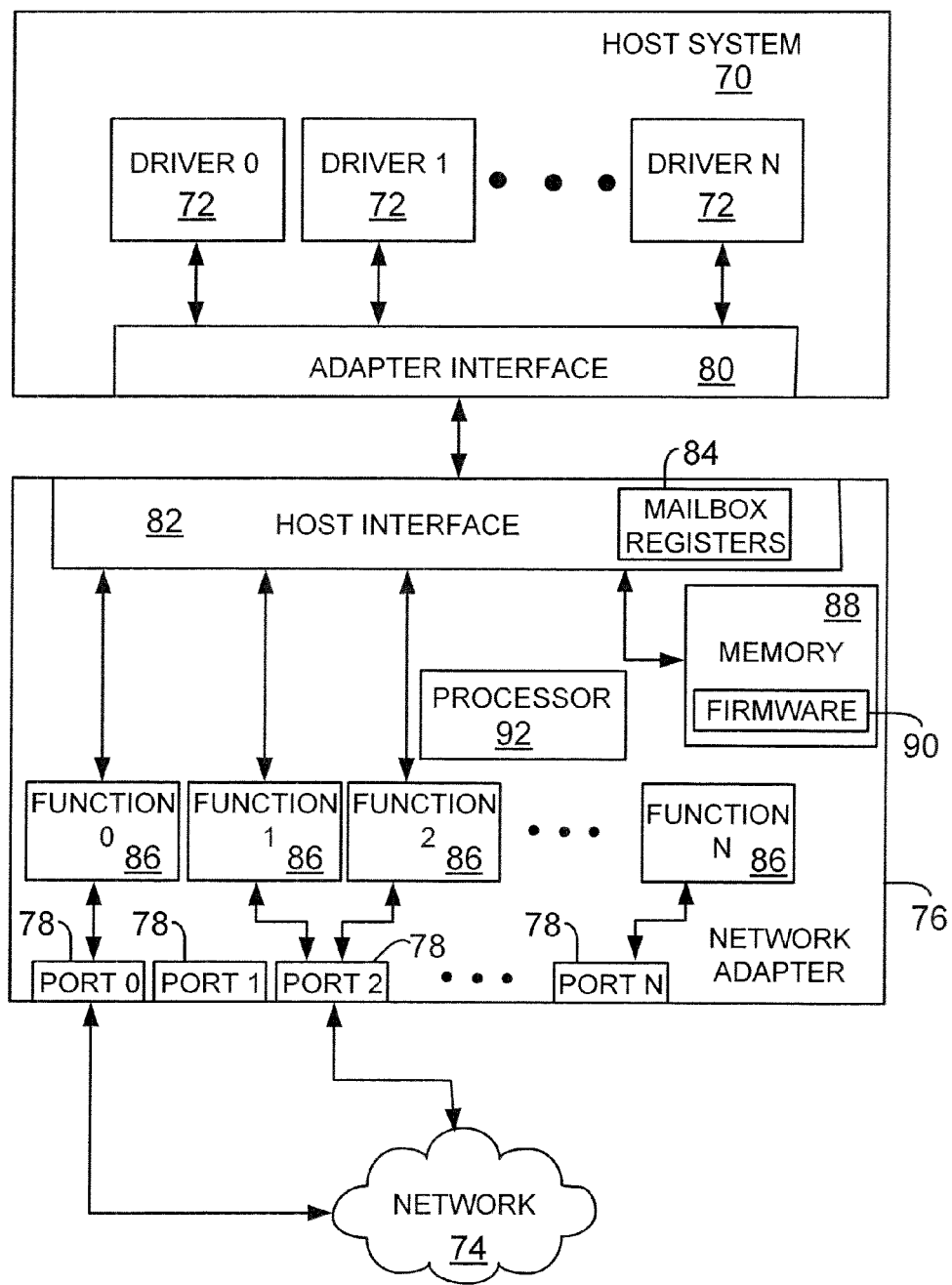
FIG. 2 is a schematic system diagram of one embodiment of the present system for inter-driver communication.

FIG. 2 is a schematic system diagram of one embodiment of the present system for inter-driver communication. A host system 70 may execute N host system drivers 72, shown as DRIVER 0 through DRIVER N. The host system drivers 72 communicate with a computer network 74 through a network adapter 76, which may be similar to the adapter 36 described above. The network adapter 76 may be, for example, a host bus adapter (HBA), but those of ordinary skill in the art will appreciate that the network adapter 76 need not be an HBA. Herein, the terms network adapter and HBA are used interchangeably.

The HBA 76 includes N ports 78 that connect the HBA 76 to the network 74. The host system 70 includes an adapter interface 80, which facilitates the host system's 70 communication with the network adapter 76. Similarly, the network adapter 76 includes a host interface 82, which facilitates the network adapter's 76 communication with the host system 70. The host interface 82 includes mailbox registers 84, which are described below. The network adapter 76 includes memory 88 that stores firmware 90. Firmware 90 is executable code for controlling overall network adapter 76 operations. The HBA 76 further includes a processor 92 that executes computer-executable process steps.

To communicate with a port 78, a host system driver 72 follows a function 86 through the HBA 76. The functions 86 may be, for example, peripheral component interconnect (PCI) functions. At startup, each host system driver 72 is mapped to one of the ports 78 over one of the functions 86. More than one host system driver 72 and more than one function 86 may be mapped to a single port 78. For example, as shown in FIG. 2 both FUNCTION 1 and FUNCTION 2 may be mapped to PORT 2. In the prior art, semaphores restrict access to hardware such that only one driver can access a particular hardware resource at a time. However, a semaphore does not provide an asynchronous notification to other drivers, and it does not allow a driver to convey additional information.

Now that more sophisticated network devices are being developed, there is a need for drivers within a host system to pass information to each other. For instance, if two functions 86 share a network interface port 78, as do FUNCTION 1 and FUNCTION 2 in FIG. 2, and a port configuration change is required, then a host system driver 72 advantageously will inform all functions 86 that share the port 78 that a configuration change is about to take place. The host system driver 72 will also advantageously provide information about the new configuration values to the other functions 86. Without advance notification, software does not have the ability to prepare for unexpected changes in the state of the hardware. Currently, host system drivers are able to communicate with the firmware running on the network adapter, but it is believed that host system drivers are not able to communicate with each other.

Figure 3:
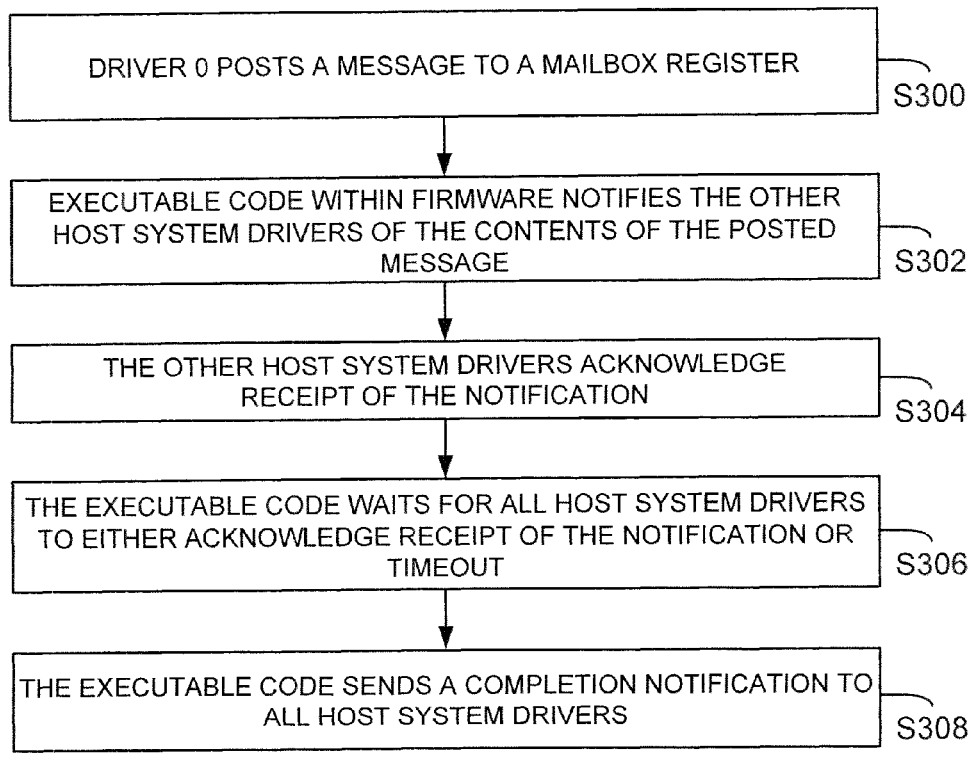
FIG. 3 is a flow chart illustrating one embodiment of the present methods for inter-driver communication.

To prevent conflicts between drivers, the present embodiments enable host system drivers 72 to communicate with each other. With reference to FIG. 2, the host interface 82 may include mailbox registers 84. A host system driver 72, such as DRIVER 0, can request firmware 90 to notify the host system drivers 72 on other functions 86 that it is about to perform an action. To do so, with reference to FIG. 3 in one embodiment at step S300 DRIVER 0 posts a message to one of the mailbox registers 84. At step S302 executable code within the firmware 90 then notifies the other host system drivers 72 of the contents of the posted message. At step S304 the other host system drivers 72 then acknowledge receipt of the notification. The acknowledgment may include a different operations code (opcode) than a request, so that adapter firmware 90 is able to distinguish the difference between a request and an acknowledgement. The information in the acknowledgement also matches the information from the original request, so firmware 90 can determine which outstanding request corresponds to the acknowledgement.

At step S306 the executable code waits for all host system drivers 72 to either acknowledge receipt of the notification or timeout after a specified amount of time. At that time, at step S308 the executable code sends a completion notification to all host system drivers 72.

Those of ordinary skill in the art will appreciate that the illustrated mailbox registers 84 are only one example of a means for enabling the host system drivers 72 to communicate with each other. For example, rather than mailbox registers, alternative embodiments may send an interrupt to the other drivers.

The present embodiments advantageously enable host system drivers to communicate with each other. This functionality reduces the likelihood of conflicts when host system drivers share hardware resources. For example, two functions in an adapter may share a network interface port. If a port configuration change is required, the present embodiments advantageously enable a host system driver to inform all functions that share the port that a configuration change is about to take place. The host system driver can also advantageously provide information about the new configuration values to other functions. Without advance notification, software does not have the ability to prepare for unexpected changes in the state of the hardware. The present embodiments enable software to prepare for such unexpected changes.

Those of ordinary skill in the art will appreciate that the present embodiments encompass many variations not specifically mentioned herein. For example, the executable code in firmware 90 could be implemented in software, or in a combination of firmware 90 and software. Other variations will be apparent to those of ordinary skill in the art.

The above description presents the best mode contemplated for carrying out the present system and methods for inter-driver communication, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A machine-implemented method, the method comprising:
enabling drivers in a host system to communicate with each other, the host system executing a first driver associated with a first function in a network adapter and other drivers associated with other functions in the network adapter;
the first driver posting a message in the network adapter, the message indicating that the first driver is about to perform an action;
executable code stored in memory of the network adapter notifying the other drivers of contents of the posted message;
the other drivers acknowledging receipt of the notification;
the executable code waiting for all of the other drivers to either acknowledge receipt of the notification or timeout after a specified amount of time; and
the executable code sending a completion notification to all of the drivers.

2. The method of claim 1, wherein the executable code is implemented in firmware.

3. The method of claim 1, wherein the executable code is implemented in software.

4. The method of claim 1, wherein the executable code is implemented in a combination of firmware and software.

5. The method of claim 1, wherein the first inter driver posts the message to a mailbox register in a host interface in the network adapter.

6. A non-transitory machine readable storage medium storing executable instructions, which when executed by a machine, cause the machine to perform a process, the process comprising:
enabling drivers in a host system to communicate with each other, the host system executing a first driver associated with a first function in a network adapter and other drivers associated with other functions in the network adapter;
the first driver posting a message in the network adapter, the message indicating that the first driver is about to perform an action;
executable code stored in memory of the network adapter notifying the other drivers of contents of the posted message;
the other drivers acknowledging receipt of the notification;
the executable code waiting for all of the other drivers to either acknowledge receipt of the notification or timeout after a specified amount of time; and
the executable code sending a completion notification to all of the drivers.

7. The machine readable storage medium of claim 6, wherein the executable code is implemented in firmware.

8. The machine readable storage medium of claim 6, wherein the executable code is implemented in software.

9. The machine readable storage medium of claim 6, wherein the executable code is implemented in a combination of firmware and software.

10. The machine readable storage medium of claim 6, wherein the first driver posts the message to a mailbox register in a host interface in the network adapter.

11. A computer program product, comprising:
a non-transitory computer usable storage medium having computer readable instructions embodied therein for enabling drivers in a host system to communicate with each other, the host system executing a first driver associated with a first function in a network adapter and other drivers associated with other functions in the network adapter, the computer readable instructions comprising:
the first driver posting a message in the network adapter, the message indicating that the first driver is about to perform an action;
executable code stored in memory of the network adapter notifying the other drivers of contents of the posted message;
the other drivers acknowledging receipt of the notification;
the executable code waiting for all of the other drivers to either acknowledge receipt of the notification or timeout after a specified amount of time; and
the executable code sending a completion notification to all of the drivers.

12. The computer program product of claim 11, wherein the executable code is implemented in firmware.

13. The computer program product of claim 11, wherein the executable code is implemented in software.

14. The computer program product of claim 11, wherein the executable code is implemented in a combination of firmware and software.

15. The computer program product of claim 11, wherein the first driver posts the message to a mailbox register in a host interface in the network adapter.

* * * * *

UNITED STATES PATENT AND TRADEMARK OFFICE
CERTIFICATE OF CORRECTION

| | |
|---|---|
| PATENT NO. | : 8,978,052 B1 |
| APPLICATION NO. | : 12/551302 |
| DATED | : March 10, 2015 |
| INVENTOR(S) | : Michael Kozlowski |

It is certified that error appears in the above-identified patent and that said Letters Patent is hereby corrected as shown below:

In the Specification

In column 2, line 10, delete "waitina" and insert -- waiting --, therefor.

In column 3, line 62, after "processor" insert -- 12 --, therefor.

In column 4, line 52, after "link" insert -- 32, --, therefor.

In the Claims

In column 7, line 37, in Claim 5, after "first" delete "inter", therefor.

Signed and Sealed this
Twenty-first Day of July, 2015

Michelle K. Lee
*Director of the United States Patent and Trademark Office*